UNITED STATES PATENT OFFICE.

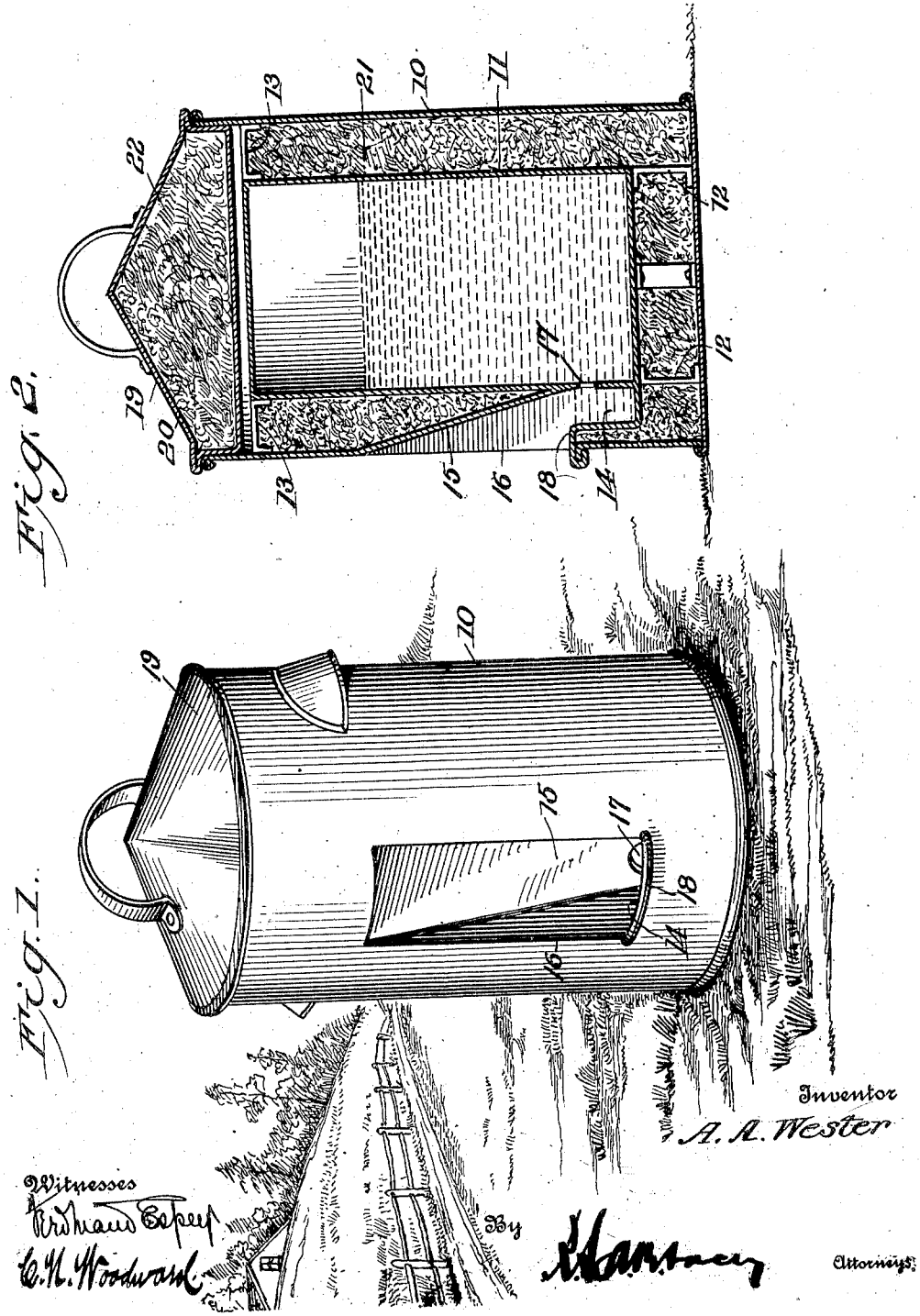

ARTHUR A. WESTER, OF BOONE, IOWA.

POULTRY-FOUNTAIN.

1,082,921.  Specification of Letters Patent.  Patented Dec. 30, 1913.

Application filed April 26, 1912. Serial No. 693,371.

*To all whom it may concern:*

Be it known that I, ARTHUR A. WESTER, a citizen of the United States, residing at Boone, in the county of Boone and State of Iowa, have invented certain new and useful Improvements in Poultry-Fountains, of which the following is a specification.

This invention relates to improvements in poultry fountains of the class wherein provision is made for supplying the water as fast as consumed, or in which the water is held back by atmospheric pressure and flows only so fast as required, and has for one of its objects to simplify and improve the construction and increase the efficiency and utility of devices of this character.

Another object of the invention is to provide a device wherein provision is made for protecting the liquid and preventing it from being frozen in cold weather.

Another object of the invention is to provide a device of this character having a single relatively small orifice for the escape of the liquid coacting with a feeding trough or receptacle which is utilized to assist in filling the reservoir.

With these and other objects in view, the invention consists in certain novel features of construction as hereinafter shown and described, and then specifically pointed out in the claim, and in the drawings illustrative of the preferred embodiment of the invention: Figure 1 is a perspective view of the improved device; Fig. 2 is a longitudinal sectional elevation.

Corresponding and like parts are referred to in the following description and indicated in all the views of the drawings by the same reference characters.

The improved device comprises an outer shell or casing 10 of any suitable material, and of any suitable size, and an inner casing or reservoir 11 for the liquid located within the outer casing and spaced therefrom on all sides. The reservoir 11 is supported from the outer casing in any suitable manner, as for instance by standards 12 and spacer members 13, so that the reservoir is maintained in position in spaced relations to the casing.

Located between the casing 10 and reservoir 11 at one side, is a small trough or receptacle 14, preferably with an outwardly and upwardly sloping upper side 15, and with a relatively large opening 16 communicating with the trough through the adjacent wall of the casing. A relatively small opening or orifice 17 is formed through the reservoir 11 and communicates with the trough 14, the upper line of the orifice being slightly below the rim 18 of the feed trough to prevent the overflow of the liquid, as will be obvious. The tank 11 is completely closed except for the orifice 17, as shown.

At its upper end the reservoir 11 is spaced below the upper line of the casing 10 and the latter is provided with a detachable closure 19 having a depending lower part 20 engaging within the upper portion of the casing 10 and terminating close to the upper end of the reservoir. The space between the casing 10 and the reservoir 11 is filled with a suitable non-conducting material represented at 21, while the space within the closure and between the members 19—20, is likewise filled with a suitable packing of non-conductive material and represented at 22. By this means the contents of the reservoir are protected from cold and will not freeze in cold weather.

To fill the reservoir 11, the device is turned on its side with the trough 14 upward and the water poured into the trough which then runs into the tank through the orifice 17. As soon as the tank is filled the device is returned to its upright position when the atmospheric pressure upon the small quantity of water remaining in the trough 14 will retain the mass of liquid within the reservoir so long as the liquid in the trough 14 is sufficient to maintain the orifice 17 closed. When the fowls drink a sufficient quantity of the liquid to expose the orifice 17, the liquid will flow from the tank into the trough until the orifice is again covered when the flow will cease. Thus the supply of liquid is maintained uniformly in the trough and supplies the fowls with drinking water just so fast as it is used and thus effectually prevents waste.

The improved device is simple in construction, can be inexpensively manufactured and of any capacity.

Having thus described the invention, what is claimed as new is:

A poultry fountain including a casing closed at its lower end and provided in its side with an opening, a reservoir closed at both ends located within the casing and having an opening in its side, the upper edge of which is located below the lower edge of the opening in the casing, a trough located below the opening of the reservoir and between the reservoir and casing and with a sloping side wall located between the reservoir and casing from the upper side of the opening in one to the upper side of the opening in the other, a cover for the casing, a plurality of U-shaped brackets secured by one arm to the inner faces of the bottom and wall of the casing and by their opposite arms to the outer faces of the bottom and wall of the reservoir with their body portions engaging against the reservoir at the junctures of its side wall with its top and bottom and in the plane of one of the walls, said brackets supporting the reservoir in spaced relation within the casing, and a packing of non-heat conducting material in the space thus provided.

In testimony whereof I affix my signature in presence of two witnesses.

ARTHUR A. WESTER. [L. S.]

Witnesses:
 JAMES WIDSON,
 G. A. NELSON.